(12) United States Patent
Carmona et al.

(10) Patent No.: US 12,379,195 B2
(45) Date of Patent: Aug. 5, 2025

(54) METHOD FOR MANUFACTURING AN AMMUNITION CARTRIDGE AND AMMUNITION CARTRIDGE

(71) Applicants: COMPANHIA BRASILEIRA DE CARTUCHOS, Ribeirão Pires (BR); SERVIÇO NACIONAL DE APRENDIZAGEM INDUSTRIAL—DEPARTAMENTO REGIONAL DO RIO GRANDE DO SUL—SENAI/RS, Porto Alegre (BR)

(72) Inventors: Andre Giacomini Dias Carmona, Canoas (BR); Andre Viegas Wentz, Porto Alegre (BR); Andre Weijh, Porto Alegre (BR); Claudio Wietky Junior, Mauá (BR); Frederico Eggers, Porto Alegre (BR); Glaucio De Almeida Carvalho, Caxias do Sul (BR); Marcelo Moreno, São Caetano do Sul (BR); Vinicius Cabreira, Porto Alegre (BR)

(73) Assignees: COMPANHIA BRASILEIRA DE CARTUCHOS, Ribeirão Pires (BR); SERVIO NACIONAL DE APRENDIZAGEM INDUSTRIAL—DEPARTAMENTO REGIONAL DO RIO GRANDE DO SUL—SENAI/RS, Porto Alegre (BR)

( * ) Notice: Subject to any disclaimer, the term of this patent is extended or adjusted under 35 U.S.C. 154(b) by 0 days.

(21) Appl. No.: 18/278,597

(22) PCT Filed: Sep. 8, 2022

(86) PCT No.: PCT/BR2022/050358
§ 371 (c)(1),
(2) Date: Aug. 23, 2023

(87) PCT Pub. No.: WO2023/097380
PCT Pub. Date: Jun. 8, 2023

(65) Prior Publication Data
US 2024/0142207 A1   May 2, 2024

(30) Foreign Application Priority Data

Dec. 1, 2021   (BR) .......................... 102021024282-5

(51) Int. Cl.
*F42B 33/00*     (2006.01)
*F42B 5/30*      (2006.01)

(52) U.S. Cl.
CPC ................ *F42B 33/00* (2013.01); *F42B 5/30* (2013.01)

(58) Field of Classification Search
CPC . F42B 33/00; F42B 5/30; B29C 33/52; B29C 33/76; B29C 45/4457
See application file for complete search history.

(56) References Cited

U.S. PATENT DOCUMENTS

| 6,146,571 A | 11/2000 | Vincent et al. |
| 8,002,533 B2 | 8/2011 | Schittelkop |
| 10,072,916 B2 | 9/2018 | Lemke et al. |

FOREIGN PATENT DOCUMENTS

JP    2002252039 A    9/2002

OTHER PUBLICATIONS

International Search Report with mailing date of Nov. 21, 2022, 2 pages.

*Primary Examiner* — Jonathan C Weber
(74) *Attorney, Agent, or Firm* — Berg Hill Greenleaf Ruscitti LLP.

(57) ABSTRACT

The present invention pertains to the field of the arms industry and metallurgy, and also to the fields of materials (Continued)

engineering and chemical engineering. More specifically, the present invention refers to a novel ammunition cartridge comprising reinforced polymer and the manufacturing process thereof. The ammunition cartridge serves for receiving the gunpowder so that explosion can occur inside the weapon barrel. The technology proposed reduces the quantity of components to be pre-manufactured and assembly processes on the product, producing a full cartridge, directly upon injecting the thermoplastic, and can also use bi-component injection. With this, the portion of the collar ring can be made entirely of fiber-reinforced polymer material, which reduces the weight of the item and is beneficial for the useful life of the weapon in the bolt region.

8 Claims, 5 Drawing Sheets

METHOD FOR MANUFACTURING AN AMMUNITION CARTRIDGE AND AMMUNITION CARTRIDGE

CROSS-REFERENCE TO RELATED APPLICATION

This application is a national stage application under 35 U.S.C. 371 of PCT Application No. PCT/BR2022/050358 having an international filing date of Sep. 8, 2022, which designated the United States, which PCT application claimed the benefit of Brazil application Ser. No. 1020210242825, filed Dec. 1, 2021, both of which are incorporated by reference in their entirety.

TECHNOLOGICAL SECTOR OF THE INVENTION

The present invention pertains to the fields of metallurgy and the arms industry, as well as the fields of materials engineering and chemical engineering.

More specifically, the present invention refers to a novel ammunition cartridge comprising reinforced polymer and the manufacturing process thereof. The ammunition cartridge serves for receiving the gunpowder so that explosion can occur inside the barrel of the weapon. The ammunition cartridge is made from two polymers, comprising metal reinforcements.

KNOWN STATE OF THE ART

Gunpowder dates from 700 B.C. and was first used in China. Accordingly, Chinese scientists and researchers created different types of fire arms including single-shot smooth-bore fire lances, multiple barrel weapons, multiple-launch artillery rockets and the first cannon in the world made of modeled bronze. The first fire arms date back to the $12^{th}$ century, in China, where gunpowder was used for the first time in combat. Consequently, the first fire arms are known as cannons. Thereafter, much research was done to make fire arms portable and, especially, in current models.

When fire arms arose in Europe, in the $14^{th}$ century, the style spread across the rest of the Asian continent and in the Middle East. They were soon adapted to be used in individual combat, as known portable fire arms today. The first were characterized by being short, with major handling difficulty, resembling hand cannons.

Portable handguns developed over the years, and began to be sorted into different classes, generally divided by their size and precision. Still around the $14^{th}$ century, the arquebus originated in the holy German empire, in the region which today is Germany. The arquebus because known as being one of the first portable fire arms to be used by infantry. It was characterized by being long, weighing about five kilograms and having a range of up to 800 meters, but had low precision, being primarily used against targets 150 meters away at most.

The $19^{th}$ century saw one of the largest peaks in the development of weapons in history. As it was a period of many wars, some countries saw a major opportunity to develop new technologies. According to the book Brothers in Arms, the War of Succession (1861-1865), it was noted that battles were decided by the technology of each battalion, and that the government army obtained advantages over the enemy, since it had at its disposal more rifles, with quicker breech loading, and the confederates had more muskets, with slower front loading.

By the start of the $20^{th}$ century, portable fire arms already had disposable loaders, being used for the first time in the First World War, where the armies already had rifles and machine guns. The Second World War witnessed another peak in arms development, and the submachine gun was born. By the end of the Second World War, assault rifles appeared. These assault rifles emerged in Nazi Germany, and were inspired in the need that, different to the First World War, where they were widely used in the trenches, in the Second World War, due to the movement of tanks and armored vehicles, the troops could not be established in one place only, requiring a lighter and more precise weapon for the movement of the combatants. The first assault rifle—the Sturmgewehr 44—was used by the Germans and is, in short, a mixture of precision and fire power of traditional rifles, with the automatic fire of the machine guns.

The Evolution in the arms industry brought about significant effort in the development of technologies focused on streamlining manufacturing processes of ammunition cartridges, as well as optimizing their constituent material. Besides acting as a container for the gunpowder, the ammunition cartridge also serves to seal the chamber of the gun at the moment of firing, focusing the expansion of the gases to drive the projectile. Additionally, the ammunition cartridge also serves as support for assembling the fuze and projectile. Jointly with the projectile and propellant, the cartridge forms the munition that is used in the inner part of the weapon barrel.

The ammunition cartridge is conventionally made of brass, owing to its ductility, mechanical resistance and oxidation. In these cases, the ammunition cartridge is made by forming that produces the shape of the product and warps the material, increasing its resistance and creating the gradient of hardnesses in regions where cold working was greater. In order to have a region with elongation capacity at the fixing end of the projectile, this region undergoes annealing heat treatment.

For the reasons cited above, researchers were motivated to seek processes and geometries that ensure the feasibility of manufacturing a cartridge-type ammunition casing, in a single component, and that has a polymer portion with different mechanical properties along its length. Accordingly, the arms industry has been studying the manufacture of cartridges made of polymer material, enabling production by injection, in a single component, using metal inserts to increase their structural resistance in the head region.

Nevertheless, to enable production of an ammunition cartridge made of polymer material, the limitations of currently existing manufacturing processes have to be overcome. In the injection molding process, parts with hollows inevitably need a part of the mold, called male, to make the inner portion of the cavity of the piece. After injection, this male needs to be removed from the part, and as such, an extraction angle in the molded component is used, like one cone inside another, so that the male can leave by the larger opening of the part. In the case of ammunition, the geometry of the ammunition cartridge can be such that the entrance of this cone is where the projectile is mounted. The format of this type of munition is called cone or "bottle". In the rear part, called head, the fuze is mounted and this is the region whereby the weapon manipulates the cartridge to insert and remove same from the chamber. On account of these geometric limitations, one of the forms currently used in the state of the art to mold an ammunition cartridge by injection is so to do without the head, with the male of the injection mold entering through this opening. Next a separate component is mounted to act as the head of the injected body, that is, the ammunition cartridge comprises two parts (a discontinuity), one being the portion of the body with the neck and the shoulder, and the other, the head (separate material).

In order for the munition to be manipulated by the weapon, a portion of the ammunition cartridge is outside the barrel, exposing the collar ring which is used by the weapon bolt as a latch. Since this portion of the head of the munition is not supported by the barrel, it should have mechanical resistance to withstand the pressure of the expansion of the gases by itself. Accordingly, an ammunition cartridge made of polymer material should preferably have a head made of more resistant material than that used in the body portion.

At the other end, for the munition to seal the combustion chamber, the portion that holds the projectile should be ductile, to elongate and support itself in the weapon chamber, preventing the flow of hot gases coming from the burning of the propellant towards the head of the cartridge.

Technologies currently existing in the state of the art present a series of problems, which are now solved by the present invention. Among them, munition manufacturing processes are known wherein the cartridge is obtained as a two-piece part (body and head), increasing the number of procedural steps by requiring two or more steps of injection of polymer (or metal) material, steps for gluing and other requirements as a consequence of the constructivity of the ammunition cartridge in two parts—the complexity of the process is increased. This problem is largely due to the difficulty in extracting the male mold through the smaller opening of the ammunition cartridge and, as an alternative, it is extracted through the larger opening. Consequently, the construction of the ammunition cartridge in two parts (body and head) is necessary, further resulting in an ammunition cartridge with low mechanical resistance due to its two parts glued together. To solve the problem of constructivity of the two-piece ammunition cartridge, some processes make use of the technique of the collapsible male, wherein the mold male is formed by a plurality of smaller parts that are manually disassembled to facilitate removal thereof through the smaller opening of the ammunition cartridge. However, this type of process causes the problem of low productivity, as it involves manual steps. Moreover, in the processes currently known, there is the use of inserts (for mechanical reinforcement of the ammunition cartridge head) that are not particularly efficient in receiving the pressure from the expansion of the propellant on the inside, heterogeneously transferring the forces to the bolt. Further, significant manufacturing processes make use of metal materials such as constituents of the ammunition cartridge head, contributing to the wear of the weapon and, consequently, shortening its useful life. For an improved understanding of the technical problems, technologies currently existing in the state of the art are described below.

Document WO2020028187A1, for example, discloses that the way to produce the polymer ammunition cartridges would be to divide the body of the munition into two pieces and make the head section in metal material. This approach solves the problem of mechanical resistance to support the expansion of the gases and mechanical resistance of the collar ring, but despite not being the lowest weight option, it creates a point of discontinuity in the rigidity of the cartridge.

In turn, document U.S. Pat. No. 10,704,876B2 teaches that another possible manufacturing form would be injection carried out with the head reinforcement over-injected, where the portion of the shoulder and neck is hot formed. However, the product of this process is a preform of the munition, which is subsequently formed in the region of the shoulder and neck.

One way of solving the difficulty of extracting the male from the mold through the opening that is smaller than the inner portion of the munition, is disclosed in document U.S. Pat. No. 10,072,916B2, which describes the use of the technique of Collapsible Male, or Retractable Core Mandrel. There, the male is formed by multiple parts that are smaller than the entrance through the neck, and which are disassembled at the moment of extracting them from inside the cartridge. This document from the state of the art does not demonstrate the mechanism for the male to operate automatically. As the assembly of the male is illustrated, it is disassembled from inside the injected part and the parts are removed, one by one, and reassembled manually. This approach enables the formation of the geometry of the cartridge, but on a very low manufacturing scale, meaning commercialization of the item is unfeasible. This technology also cites a metal insert to form the head region, wherein said inserts cover the unsupported portion of the head, the region of the collar ring and the fuze pocket.

Considering the technical problems in the technologies from the state of the art described herein, it is noted that despite being known solutions for same, the manufacturing processes of polymer ammunition cartridges fail to present a solution where the injection is applied jointly with metal reinforcements on the ideal points of the cartridge. Moreover, the solutions known in the state of the art propose processes that divide the cartridge or only solve the withdrawal of the male. With this, the solutions found cause lower resistance and increased manufacturing cost of the cartridges. This being the case, it is understood that there is a need to develop a solution whose main characteristics are simplifying the process and the using material with greater structural resistance, generating greater manufacturing facility.

NOVELTY AND OBJECTIVES OF THE INVENTION

The present invention presents a solution to solve the problems of producing polymer ammunition cartridges. The technology proposed reduces the quantity of components to be prefabricated and assembly processes on the product, producing a full cartridge, directly upon injecting the thermoplastic, and bicomponent injection may also be used. With this, the portion of the collar ring can be made entirely of fiber-reinforced polymer material, which reduces the weight of the item and is beneficial to the useful life of the weapon in the region of the bolt. This region in automatic weapons receives the impact strain of the metal cartridge and sustains wear over time. The lower the hardness on this interface of the munition, the less damaged caused to the support face of the bolt.

Accordingly, the invention can be divided into three innovative characteristics that assure the feasibility, jointly or separately, high-performance munition. The first, injection manufacturing using a castable or consumable core. The use of bicomponent injection with break plate to obtain a transition gradient between two polymers in the piece itself. And lastly, the addition of over-injected inserts in the unsupported region of the head of the munition.

Preferably, the castable core is produced by forming. It is thus possible to melt a large quantity of metal alloy, cool it all at once, cut the material and send it to a line of forming presses that will manufacture the cores on a scale far superior to metal injection. The process also has the advantage of re-using traditional equipment and expertise from the brass ammunition manufacturing line, facilitating the entry of this new product into the manufacturers' portfolios.

Bicomponent injection enables weight reduction to be achieved, unprecedented in the current art. Using one of the cannons from injector loaded with ductile polymer, suitable for the rear region of the munition, where the projectile is fixed, and the other loaded with reinforced polymer by fibers, ideal for the region where resistance to traction is the property needed to assure the operating feasibility of the munition. One way of using this technology is the injection using a break plate to make the mixture between the polymers during the change of the cannons. It is therefore possible to produce a continuous and seamless transition between the materials.

Moreover, bicomponent injection with break plate enables the polymers to mix during the transition between the cannons. This mixture forms a gradient where the variation in property along the part varies continuously.

Lastly, the invention proposes a new metal insert for the head region. The invention proposes a metal component which has the sole function of reinforcing the cartridge in the head region, region where the munition has no radial support of the chamber of the weapon. This insert has a geometry such that it receives the pressure from the expansion of the propellant in a concave cylindrical portion, to homogeneously transfer the forces to the bolt, through a straight cylindrical portion, located solely around the fuze pocket. As far as inventors are aware, no metal inserts with this geometry are used in ammunition cartridges, much less manufactured by the methods of lost core and over-injection by the bicomponent method.

Moreover, a low weight cartridge-type munition is also presented, comprising the cartridge manufactured by the preceding process, projectiles, the starter fuze and the propellant charge contained by this cartridge. The munition used in armaments of varied calibers, automatic, semiautomatic or manual. It is most commonly used in military armaments, more specifically in machine guns and rifles. The product is a light cartridge that substantially reduces the use of metal materials in order to obtain the maximum possible reduction in weight. The main purpose of weight reduction is logistical gains in the transport of large quantities of munition.

BRIEF DESCRIPTION OF THE INVENTION

In a first aspect, the present invention refers to a manufacturing process of an ammunition cartridge comprising the following steps:
  production of a core, said step comprising the following substeps:
    premanufacturing the core;
  producing a metal insert, said step comprising the following substeps:
    machining the metal insert;
  Preparing the ammunition cartridge, said step comprising the following substeps:
    adding the core, produced according to the preceding step, and the metal insert, produced according to the preceding step, into a mold; injecting an injection fluid into the mold, said mold comprising the core and the metal insert;
    cooling and solidifying the injection fluid;
    removing from the cavity, and obtaining an assemblage, said assemblage comprising the ammunition cartridge and the core inserted therein;
    removing the core from the ammunition cartridge by means that alter its structural integrity or the physical state of said core from solid to liquid, obtaining a core in liquid state;
  recycling the core in liquid state, said step comprising the following substeps;
    pouring the core in liquid state into a recipient; and
    solidifying the core in liquid state, obtaining the core, and returning the core to the first step of the process,
    wherein the steps of producing the core and the metal insert occur in parallel, and
    wherein the core is castable, or consumable.

In a second aspect, the present invention refers to an ammunition cartridge obtained by means of the process described herein, said ammunition cartridge comprising a head portion and a body portion, said head portion having an end formed by a ring, wherein said ammunition cartridge comprises a body portion and the head portion made in a single piece (continuous), and wherein said ammunition cartridge comprises a metal insert (2) in the head portion.

BRIEF DESCRIPTION OF THE DRAWINGS

So that the present invention can be fully understood and put into practice by any technician from this technological sector, same will now be described in a clear, concise and sufficient [full] manner, based on the accompanying drawings, which illustrate and support it, as listed below.

DETAILED DESCRIPTION OF THE INVENTION

Figure 1:
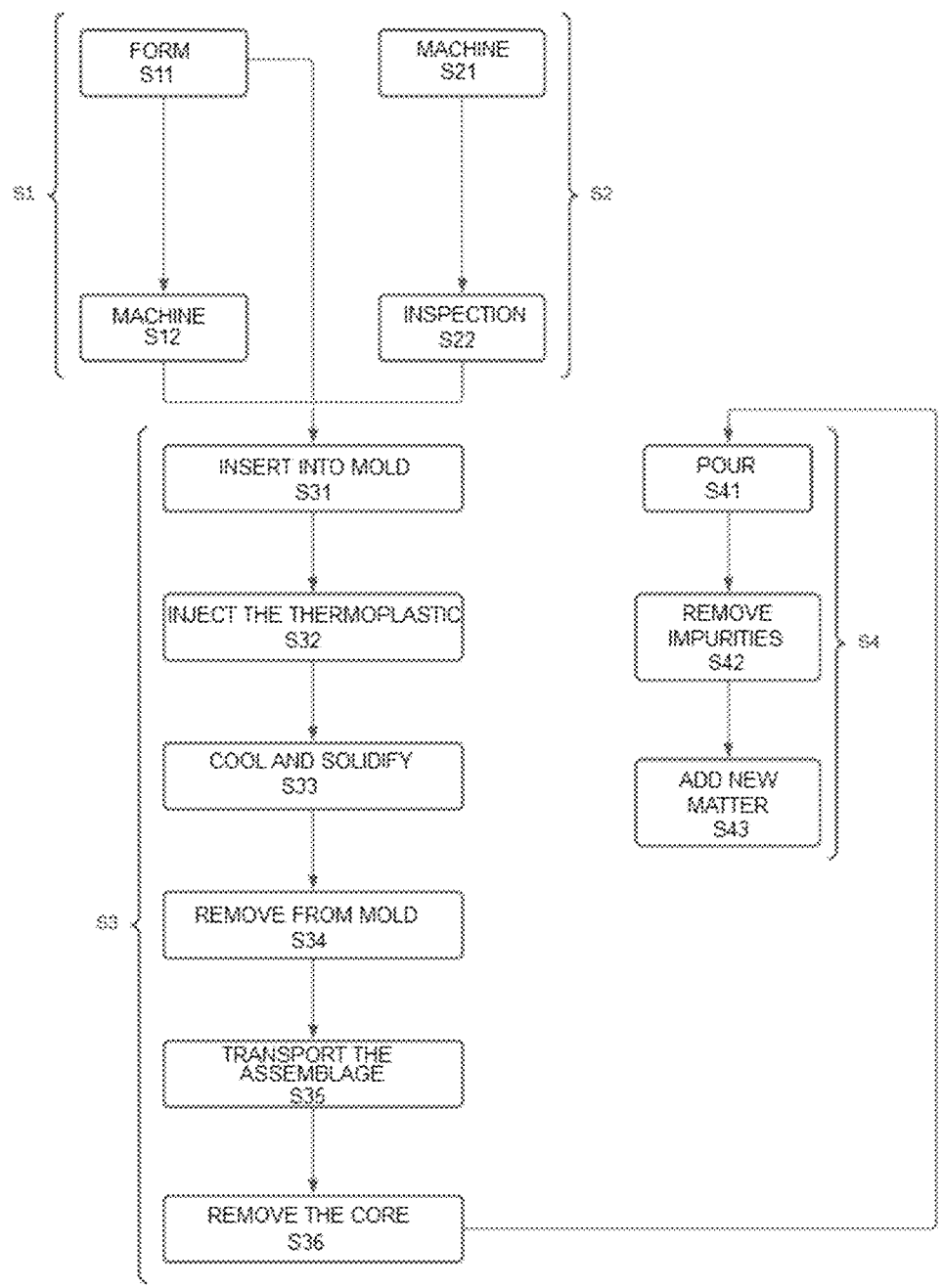
FIG. 1 Flowchart of the manufacturing process of the cartridge.
Figure 2:
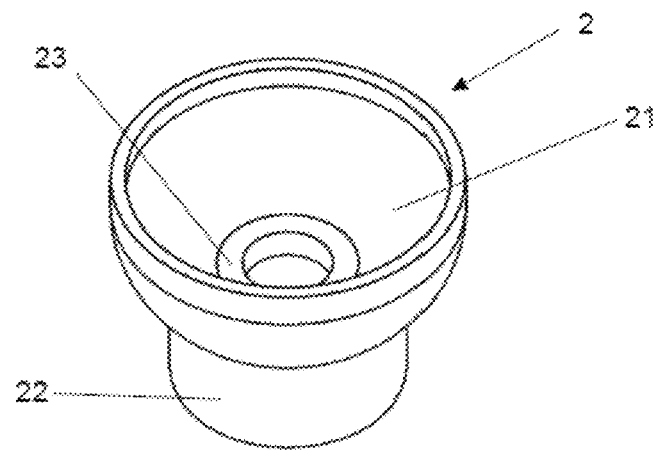
FIG. 2 represents a perspective view of the metal insert.
Figure 3:
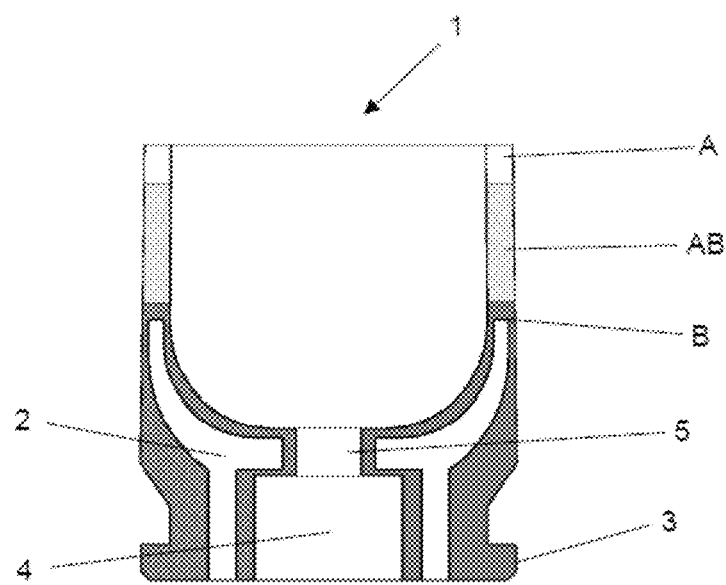
FIG. 3 represents a cutaway view of the base of the munition.
Figure 4:
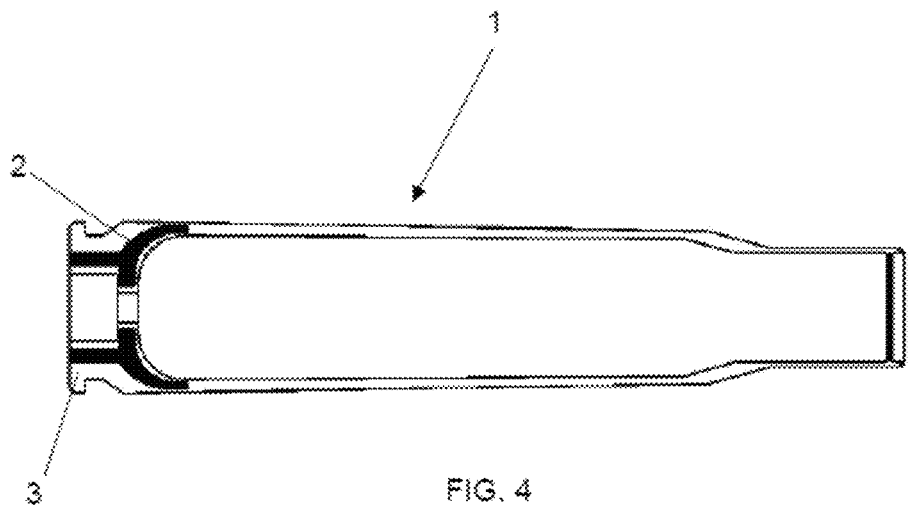
FIG. 4 represents a side cutaway view of the munition.

In a first aspect, the present invention refers to an AMMUNITION CARTRIDGE MANUFACTURING PROCESS (1) comprising the following steps:
  (S1) producing a core (6), said step (S1) comprising the following substeps:
    (S11) premanufacturing the core (6);
  (S2) producing a metal insert (2), said step (S2) comprising the following substeps:
    (S21) obtaining the metal insert (2) by machining, injection, sintering or forming;
  (S3) preparing the ammunition cartridge (1), said step (S3) comprising the following substeps:

(S31) adding the core (6), produced according to the step (S1), and the metal insert (2), produced according to the step (S2), into a mold (7);

(S32) injecting a molding material of the cartridge (1) into the mold (7), said mold (7) comprising the core (6) and the metal insert (2);

(S33) cooling and solidifying the material injected from step (S32);

(S34) removing the mold (7), and obtaining an assemblage (8), said assemblage (8) comprising the ammunition cartridge (1) and the core (6) inserted therein;

(S36) removing the core (6) from the ammunition cartridge (1) by means that alter its structural integrity or the physical state of said core (6) from solid to liquid or to a gas, obtaining a core (6) in liquid or gaseous state; and obtaining the ammunition cartridge (1).

(S4) recycling the core (6) in liquid state, said step (S4) comprising the following substeps;

(S41) pouring the core (6) in liquid state into a recipient; and (S44) solidifying, obtaining the core (6), and returning it to step (S11), wherein steps (S1) and (S2) occur in parallel, and wherein the core (6) is castable or consumable.

For improved understanding of the present invention, as well as the scope thereof, the term "castable" refers to an embodiment of the present invention wherein the core (6) is a castable core (6), that is, it can be cast by heating to temperatures that are equivalent or exceed its melt temperature.

For improved understanding of the present invention, as well as the scope thereof, the term "consumable" refers to an embodiment of the present invention wherein the core (6) is a consumable core (6), that is, it can be solubilized by means of solvents or sublimated.

According to FIG. 1, the process comprises a step (S1) of producing the core (6), in parallel with a step (S2) of producing the metal insert (2), followed by a step (S3) of producing the ammunition cartridge (1).

In a non-restrictive embodiment of the present invention, the premanufacture of the core (6) comprised in substep (S11) comprises the techniques of casting, injection of metals, centrifugal casting, additive manufacturing, sintering, mechanical forming or any method that produces the component in a metal material, the technique preferably being mechanical forming or the injection of metals.

In a preferred and non-restrictive embodiment of the invention, the core (6) is made by the method of mechanical forming (S11), where a semi-finished preform made of a material with melt temperature lower than softening temperature of the molding material in substep (S32) is sent to a line of forming presses. With this, the preform will be pressed, deformed and molded by arrays until the geometry of the core (6) is created.

In a non-restrictive embodiment of the present invention, step (S1) optionally comprises a substep (S12) subsequent to substep (S11), said substep (S2) comprising the machining of the core (6) coming from substep (S11). The machining of the core (6) consists of obtaining the raw material of the core in a preform suitable for lathing. Lathing using manual or computer-controlled equipment removing material until the final geometry of the core (6) is obtained. Adjusting the dimensions until the desired tolerance is obtained by grinding or polishing methods, as necessary. After being obtained in substep (S11) or by substep (S12), the core (6) is sent to the mold (7) which will receive the molding material in the step (S3) of preparing the ammunition cartridge (1).

In parallel, in the step (S2) of producing the metal insert (2), the substeps (S21) of machining the metal insert (2) are carried out, followed by the additional and optional substep (S22) of inspection and refining.

Relative to substep (S21), the machining of the metal insert (2) is carried out by lathing and milling methods, as necessary, and can be performed on equipment operated manually or by numeric control. This step seeks to obtain the part at the upper limit of tolerance for subsequent refining up to the nominal quota.

Relative to substep (S22), the inspection and refining of the metal insert (2) is carried out by manual or automatic methods for checking critical assembly dimensions and subsequent polishing and/or grinding. Once finalized, the metal insert (2) is sent to the mold (7), which will receive the molding material in the step (S3) of preparing the ammunition cartridge (1).

The step (S3) of preparing the cartridge (1) begins in substep (S31), when the finalized metal insert (2) and the core (6) are inserted into the mold (7).

Further relative to substep (S31), the cavity of the mold (7), after receipt of the core (6) and of the metal insert (2), comprises an internal volume Vp, one and a half times smaller than the volume of the core Vn, or smaller, when made of metal alloy and using molding material with injection temperature higher than the melt temperature of a metal alloy that makes up the metal insert (2). Preferably the Vn/Vp ratio is between 1 and 4, and more preferably is 2.6.

In one embodiment of the invention, using a metal alloy as being a eutectic tin-lead alloy and a molding material with injection temperature of up to 420° C., the volume of the cavity Vp should be, at least, half the volume of the core (6) Vn, preferably the Vn/Vp ratio is between 2 and 3, and more preferably is 2.6.

In another embodiment of the invention, using a metal alloy as being a eutectic metal alloy bismuth-lead and a molding material with injection temperature of up to 420° C., the volume of the cavity Vp should be at least five times smaller than the volume of the core (6) Vn, preferably the Vn/Vp ratio is between 5 and 6, and more preferably is 5.5.

In another embodiment of the invention, using a metal alloy as being a eutectic metal alloy bismuth-lead and a molding material with injection temperature of up to 300° C., the volume of the cavity Vp should be at least half of the volume of the core (6) Vn, preferably the Vn/Vp ratio is between 2 and 3, and more preferably is 2.5.

From the geometric viewpoint, the mold (7) comprises a longitudinal partition relative to the cartridge, injection channels (9) and cassettes (10) for fastening in the core (6) such that the male of the cavity is in a dual-supported position. This dual-support fastening is vital for assuring concentricity between the internal and external diameter of the cavity.

In a non-restrictive embodiment of the present invention the molding material is a polymer material (i). In this situation, the polymer material (i) is added to the mold (7) (comprising the core (6) and the metal insert (2)) at temperatures between 280° C. and 420° C., preferably 390° C.

In a non-restrictive embodiment of the present invention, the polymer material (i) is a fluid of a (i-1) single polymer or a (i-2) mixture of two polymers A and B;

In a non-restrictive embodiment of the present invention, the volume ratio of polymer A relative to the polymer B in the (i-2) mixture of two polymers A and B is selected from the range between 95:5 (v:v): and 20:80 (v:v), preferably 40:60 (v:v).

In a non-restrictive embodiment of the present invention, the polymer A is selected from the group comprising polyurethane pre-polymer, cellulose, fluoropolymer, interpolymer ethylene alloy elastomer, ethylene vinyl acetate, nylon, polyetherimide, polyester elastomer, polyester sulfone, polyphenylamide, polypropylene, polyvinylidene fluoride or thermosetting polyurea elastomer, acrylics, homopolymers, acetates, copolymers, acrylonitrile-butadinene-styrene, fluoropolymer thermoplastics, inomers, polyamides, polyamide-imides, polyacrylates, polyacrylates, polyacrylates, polyacrylates polycarbonates, polybutylene, terephthalates, polyether imides, sulfones polymer, thermoplastic polyimides, thermoplastic polyurethanes, polyphenylene sulfides, polyethylene, polypropylene, polysulfones, polyvinylchlorides, styrene acrylonitriles, polystyrenes, polyphenylene, mixtures of ether, styrene maleic anhydrides, polycarbonates, allyls, amines, cyanates, epoxies, phenolics, unsaturated polyesters, bismaleimides, polyurethanes, silicones, vinylesters, urethane hybrids, polyphenylsulfones, copolymers of polyphenylsulfones with polyetersulfones or polysulfones, copolymers of polyphenylsulfones with siloxanes, mixtures of polyphenylsulfones with polyphenylsulfones with polyetersulfones or polysulfones, copolymers of polyphenylsulfones with siloxanes, mixtures of polyphenylsulfones of polyphenylsulfones with copolymers of polyphenylsulfones and copolymides of polyphenylsulfones with siloxanes, mixtures of polyphenylsulfones and copolymides of polyphenylsulfones, polysiloxanes, or mixtures of polyetherimides and copolymers of poly (etherimide-siloxane).

In a non-restrictive embodiment of the present invention, the polymer B is a mixture of polymer B with a structural reinforcement, said structural reinforcement being selected from the group comprising fiberglass, carbon or aramid, and said polymer B being selected from the group comprising polyurethane pre-polymer, cellulose, fluoropolymer, interpolymer ethylene alloy elastomer, ethylene vinyl acetate, nylon, polyether imide, polyester elastomer, polyester sulfone, polyphenyl amide, polypropylene, polyvinylidene fluoride or thermosetting polyurea elastomer, acrylics, homopolymers, acetates, copolymers, acrylonitrile-butadinene-styrene, fluorine thermoplastic polymers, inomers, polyamides, polyamide-imides, polyacrylates, polybaterketones, polypharyl-sulfones, polybaterylates, polyether imides, polyether sulfones, thermoplastic polyimides, thermoplastic polyurethanes, polyphenylene sulfides, polyethylene, polypropylene, polysulfones, polyvinyl chlorides, acrylonitrile styrene, polystyrenes, polyphenylene, mixtures of ether, styrene maleic anhydrides, polycarbonates, allyls, aminolates, and unsaturated polyester, bismaleimides, polyurethanes, silicones, vinylesters, urethane hybrids, polyphenylsulfones, copolymers of polyphenylsulfones with polyetersulfones or polysulfones, copolymers of polyphenylsulfones with siloxanes, mixtures of polyphenylsulfones (polyphenylsulfones with polysiloxanes) and mixtures of polyetherimides and copolymers of poly (etherimide-siloxane).

In a non-restrictive embodiment of the present invention, in the mixture of polymer B with structural reinforcement the volume ratio of polymer B relative to the structural reinforcement is selected from the range between 95:5 (bv) and 40:60 (bv), preferably 60:40 (bv).

Further relative to substep (S32) and in the embodiments of the invention relating to the use of the mixture of the polymers A and B, the injection of the molding material is carried out by bicomponent injection, where the cavity closes and that of the injection cannons begins to inject the polymer A, to make up a portion of the ammunition cartridge body (1). During this process, the break plate, which couples the injection cannons before the molding material enters the mold, gradually closes the polymer A passage and releases the passage for polymer B which is in another cannon of the injector. The polymer B makes up the portion of the ammunition cartridge head (1), such that at the end of the injection of the molding material, the ammunition cartridge (1) comprises the body portion and the head portion as a single piece, resulting from a single injection of the molding material.

At the end of the injection of the molding material by bicomponent injection in step (S32), the bicomponent injector ceases the pressure, initiating substep (S33), relating to the wait time for cooling and solidification of the molding material. In a non-restrictive embodiment of the present invention, the wait time for solidification of the molding material is selected from the range between 10 and 120 seconds, preferably up to 30 seconds.

After step (S34) of removal from the mold (7), the assemblage (8) comprising the ammunition cartridge (1) with the metal insert (2) and core (6) is trapped inside said ammunition cartridge (1). In this context, the assemblage (8) is removed by robot capture devices that position the assemblage (8) in a line of a transporter to the next processing step. Manual removal of the assemblage (8) from the mold (7) is possible, though not recommended, since the assemblage (8) leaves the mold at a high temperature and should be handled with EPIs that adversely affect the operator's skill.

For removal of the core (6) according to substep (S36), the assemblage (8) formed is transported, being a substep (S35), to the place where said removal of the core (6) is carried out.

Relative to substep (S36), in a non-restrictive embodiment of the present invention, the means that alter the structural integrity or the physical state of the core (6) are techniques selected from the group comprising heating by induction, bathing or solubilization.

Figure 8:
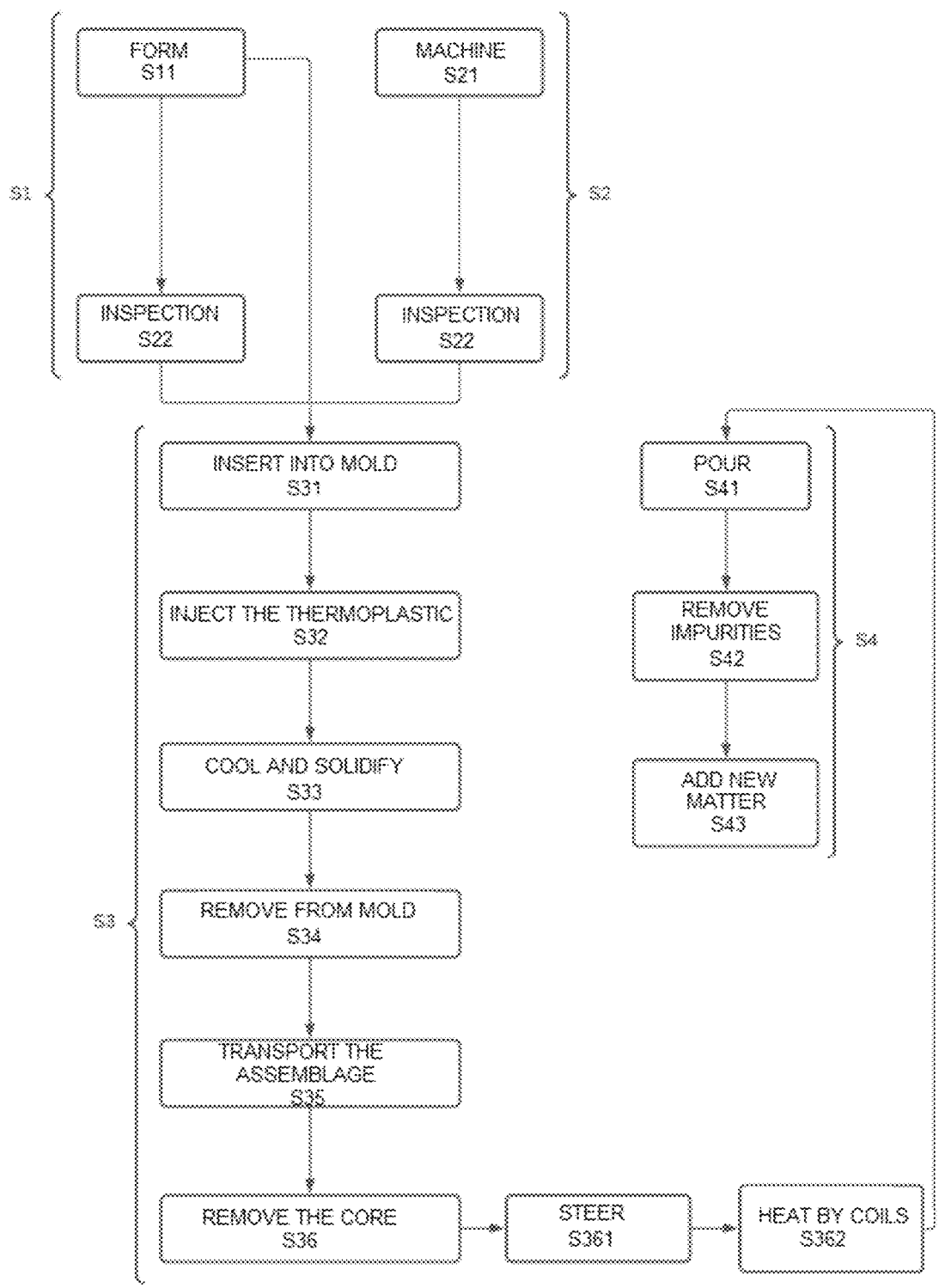
FIG. 8 flowchart of a variation of the manufacturing process of the cartridge.

In a non-restrictive embodiment of the present invention, heating by induction occurs at a heating by induction station, being the preferred technique, but not limitative from the point of view of scope of the present invention. This preferred and non-limitative technique is illustrated in FIG. 8 by means of substeps (S361) and (S362). In this technique, the assemblage (8) is subjected to the steering substep (S361), that is, said assemblage (8) is placed in a queue and with the greater opening steered downwards in the direction of gravity. In this position the assemblage (8) passes through a sequence of induction coils (substep (S362)) which heat the core (6) to a maximum temperature of up to 95% of the thermal deflection temperature of the material when measured by the ASTM D648B standard, starting in the lower portion, making the core (6) attain melt temperature and come unstuck from the ammunition cartridge (1).

In a non-restrictive embodiment of the present invention, the technique of heating bath for removal of the core (6) consists of bathing the assemblage (8) in a hot bath at the melt temperature of the core (6) and waiting for the core (6) to pour inside the ammunition cartridge (1).

In a non-restrictive embodiment of the present invention, the technique of solubilization for removing the core (6) consists of exposing the core (6) to the solvent, preferably heated, with a flow of the solvent over the core (6), preferably with stirring, preferably with ultrasonic stirring.

In a non-restrictive embodiment of the present invention, the technique of sublimation for removal of the core (6) consists of heating it to its sublimation temperature, such that the core (6) is removed by transformation thereof from solid to gaseous state. After the removal of the core (6) in substep (S36), the ammunition cartridge (1) is ready to advance in the process of assembling the munition, and the core (6) removed initiates its cycle of return to the castable male geometry. This return begins at the moment it is melted and poured into a recipient described in substep (S41)—described in greater detail ahead—where it solidifies and is transported to the cutting station to go back to being a preform.

The step (S4) occurs soon after the core (6) in liquid state has drained from the ammunition cartridge (1) in substep (S36).

In substep (S41), the liquid core (6) is poured into a recipient.

In a non-restrictive embodiment of the present invention, the process described herein, object of the present invention, optionally comprises a substep (S42), subsequent to substep (S41), comprising removal of impurities from the supernatant material of the core (6) in liquid state.

In a non-restrictive embodiment of the present invention, the process described herein, object of the present invention, optionally comprises a substep (S43), subsequent to substep (S42), comprising the addition of a new raw material as the need arises, into the core (6) in liquid state. The raw-materials consist of metal alloys with low melt point such as bismuth-tin-cadmium (53.5Bi-26Sn-20.5Cd), bismuth-lead (56.5Bi-43.5Pb), bismuth-tin (57Bi-43Sn), tin-lead-silver (62.5Sn-36Pb-1.5Ag), tin-lead-bismuth (63Sn-34Pb-3Bi), tin-lead (61.9Sn-38.1Pb) and tin-zinc (89.1Sn-8.9Zn).

In a non-restrictive embodiment of the present invention, the recipient described in substep (S41) may be in the shape of an ingot or already be a preform which will later be transformed into a new core (6) (or new male) for molding by injection, by mechanical forming and/or by machining.

In a non-restrictive embodiment of the present invention, the core (6) is a metal alloy selected from the group comprising eutectic alloys of tin and lead or tin and zinc, and the metal insert (2) is a metal selected from the group comprising aluminum, brass or steel.

In a second aspect, the present invention refers to an AMMUNITION CARTRIDGE (1) obtained by means of the process described herein, said ammunition cartridge (1) also illustrated according to FIGS. 2 to 6, said ammunition cartridge (1) comprising a head portion and a body portion, said head portion having one end formed by a ring (3), wherein said ammunition cartridge (1) comprises the body portion and the head portion made in a single piece (continuous), and wherein said ammunition cartridge (1) comprises a metal insert (2) in the head portion, said metal insert (2) comprising a geometry that enables the ammunition cartridge (1) to be reinforced. According to FIG. 2, the metal insert (2) comprises a concave cylindrical portion (21) which receives the pressure from the expansion of the propellant and homogeneously transfers the forces to the bolt, by way of a straight cylindrical portion (22), located solely around the fuze pocket (4). Lastly, the metal insert (2) further comprises a flat portion (23) aligned with an event bore (5) and parallel to the face of the weapon bolt.

In a non-restrictive embodiment of the present invention, the single piece that makes up the ammunition cartridge (1) is comprised of the (i-1) single polymer or of the (i-2) mixture of two polymers A and B, wherein when said ammunition cartridge (1) is comprised of the (i-2) mixture of two polymers A and B, said ammunition cartridge (1) comprises the lower portion comprised of the polymer B followed by a merging region of the polymers (AB) for the remainder of the body of the ammunition cartridge (1) is comprised of the polymer A.

In a non-restrictive embodiment of the present invention, the metal insert (2) is comprised of a material with high yield strength, preferably greater than 300 Mpa.

Example

The following examples are preferred. However, they should not be construed as limitative on the scope of protection, just being examples to demonstrate preferred embodiments, viewing improved understanding of the present invention.

In the step (S1) of the manufacturing process of ammunition cartridge (1), the substep (S11) is best performed by the technique of mechanical forming or by the technique of injection of metals, in the presence or absence of substep (S12).

In step (S2), the metal insert (2) for reinforcing the head can be made of any metal with yield strength higher than 500 MPa, such as, for example, aluminum 7075-t6, hard brass UNS C36000%, steel SAE 4340 and SAE 4130 among others.

In substep (S32), the molding material used is a mixture of two polymers A and B, in the volume ratio A:B (bv) of 40:60. In this context, the polymer A is the PPSU and the polymer B is mixture of 60% (bv) of PPSU reinforced with 40% (bv) of fiberglass, such that the molding material is injected into the mold (7), as described for step (S32), at a temperature of 390° C., until filling the internal volume of the mold (7), which presents an internal volume two and a half times smaller than the volume of the core.

Specifically, in one embodiment of the invention, it is possible to combine the polymer polyphenylsulfone or polyetherimide, PPSU or PEI, respectively, as polymer A, with another grade of the same resin reinforced with fiberglass or carbon as polymer B. Commercial materials with these characteristics such as the Basf Ultrason® P, Solvay Radel® 5800 and Sabic Ultem® 1000 can be used as polymer A. To feed the second cannon, the materials Basf Ultrason® E 2010 G6, Solvay Radel® RG-5030 or Sabic Ultem® 2400 can be used as polymer B.

In substep (S36), the preferred techniques for removing the core (6) is the heating by coils, such that heating for removing the core (S36) is performed up to the melt temperature of any of the examples of core (6) now described above. Therefore, the melt temperature of the core (6) is lower than the melt temperature of the polymers A and B already solidified.

Step (S4) is best performed in the presence of substeps (S42) and (S43).

Figure 5:
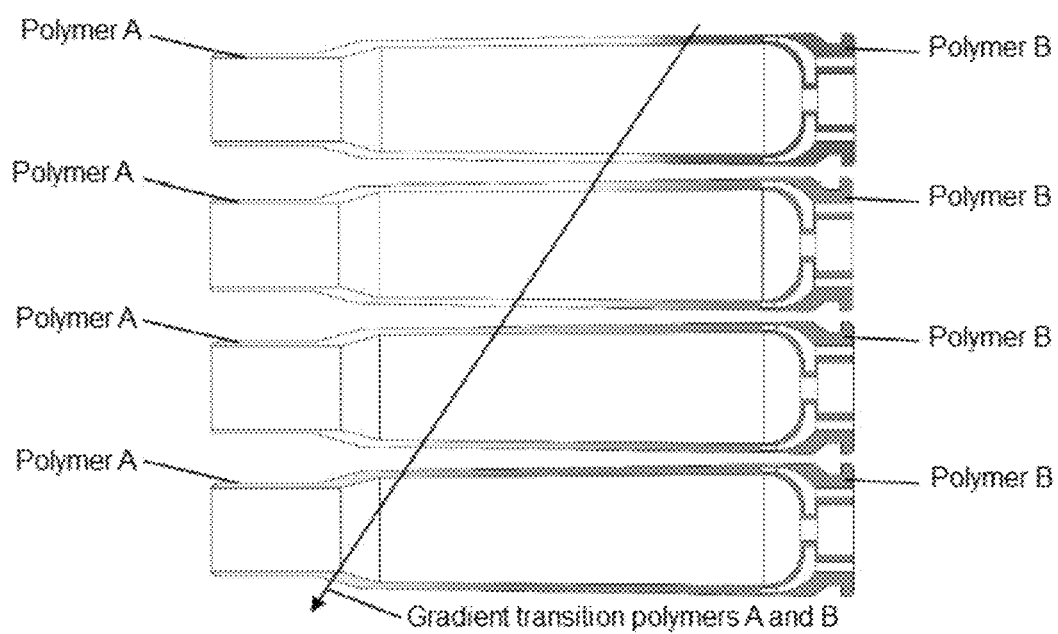
FIG. 5 represents possible arrangements of the mixture gradient of the polymer A and B.
Figure 6:
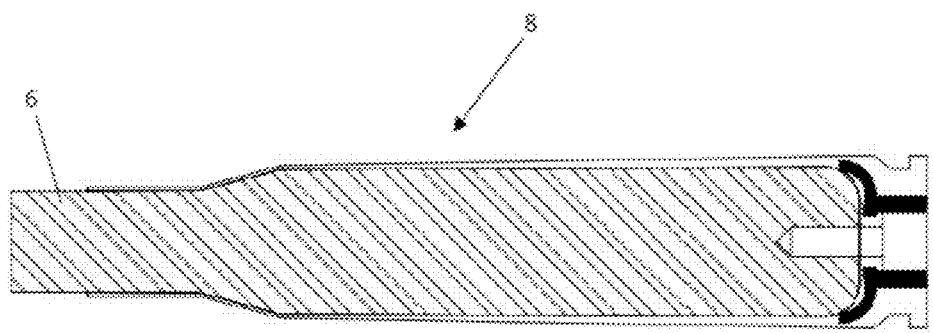
FIG. 6 represents a picture of the castable core, fastened to the recently injected cartridge, immediately prior to step S36 where the metal material is melted and withdrawn from the cartridge.
Figure 7:
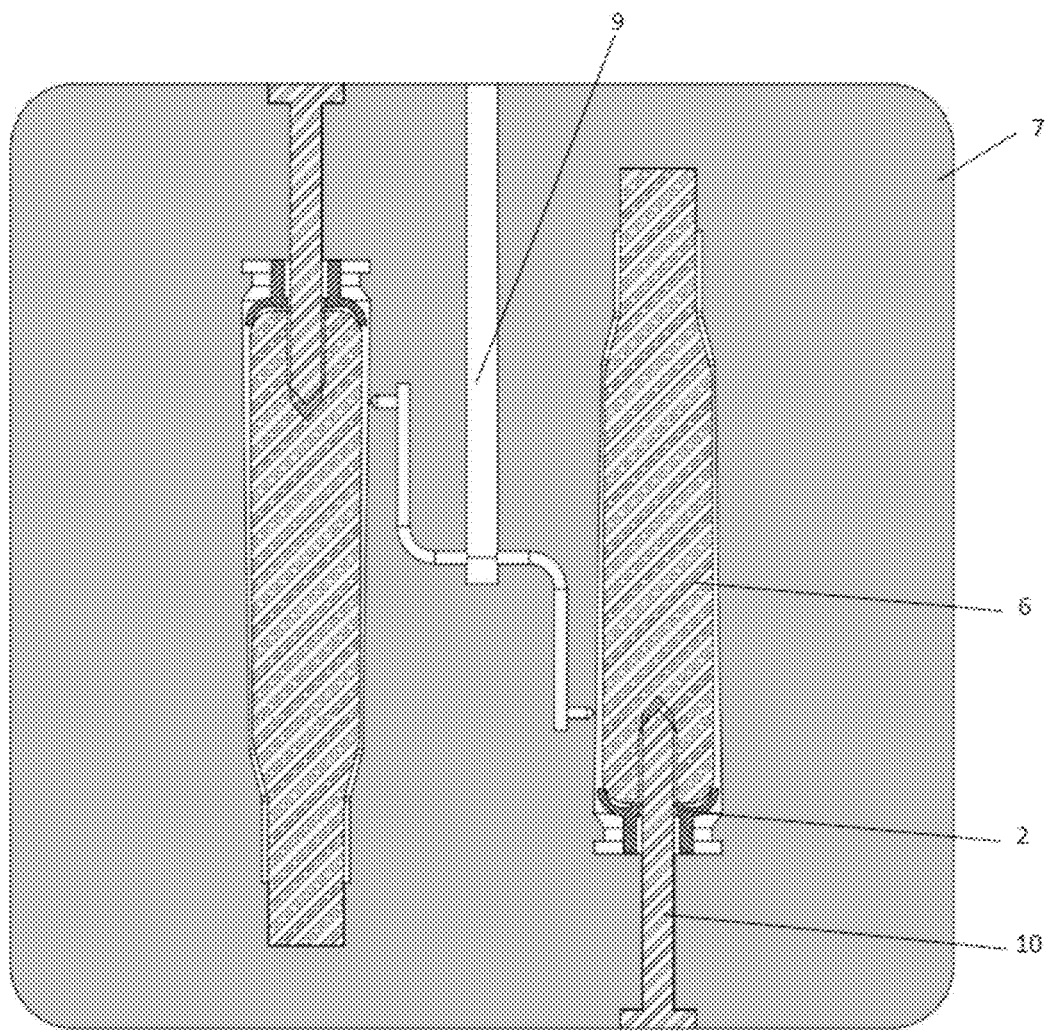
FIG. 7 represents a picture of a possible configuration of the injection mold with two cavities where it is possible to see the core, the metal insert mounted in the cavities, their cassettes and injection channels.

The ammunition cartridge (1) now obtained by the process is comprised by the polymer PPSU (polymer A) and mixture of 60% (bv) of polymer PPSU (polymer B) reinforced with 40% (bv) of fiberglass. The polymers A and B are mixed during injection producing a transition gradient, as illustrated in FIG. 5. Lastly, the preferred geometry of the ammunition cartridge (1) as a whole is the one such as illustrated in detail in FIGS. 2 to 5 and such as that described in detail herein previously.

It is important to underline that the figures and description do not have the weight of limiting the embodiments of the inventive concept now proposed, but rather illustrate and provide understanding of the conceptual innovations disclosed in this solution. Therefore, the descriptions and drawings should be interpreted in an illustrative and non-limitative manner, and there may be other equivalent or similar forms of implementing the inventive concept now disclosed and that do not stray from the scope of protection defined in the solution proposed.

The present specification refers to a manufacturing process and a polymer cartridge, endowed with novelty, inventive activity, descriptive sufficiency [full disclosure], industrial application and, consequently, meets all the essential requirements for the grant of the privilege sought.

The invention claimed is:

1. A method of manufacturing an ammunition cartridge comprising the following steps:
    (S1) producing a core (6), said step (S1) comprising the following substeps:
        (S11) premanufacturing the core (6);
    (S2) producing a metal insert (2), said step (S2) comprising the following substeps:
        (S21) obtaining the metal insert (2) by machining, injection, sintering or forming;
    (S3) preparing an ammunition cartridge (1), said step (S3) comprising the following substeps:
        (S31) adding the core (6), produced according to the step (S1), and the metal insert (2), produced according to the step (S2), into a mold (7);
        (S32) injecting a molding material into the mold (7), said mold (7) comprising the core (6) and the metal insert (2);
        (S33) cooling and solidifying the molding material from step (S32);
        (S34) removing the mold (7), and obtaining an assemblage (8), said assemblage (8) comprising the ammunition cartridge (1) and the core (6) inserted inside said ammunition cartridge (1); and
        (S36) removing the core (6) from the ammunition cartridge (1) by means that alter its structural integrity or the physical state of said core (6) from solid to liquid or to a gas, obtaining a core (6) in liquid or gaseous state; and obtaining the ammunition cartridge (1);
    (S4) recycling the core (6) in liquid state, said step (S4) comprising the following substeps;
        (S41) pouring the core (6) in liquid state into a recipient; and
        (S44) solidifying the core (6) in liquid state, obtaining the core (6), and returning the core (6) to step (S11), wherein steps (S1) and (S2) occur in parallel, and wherein the core (6) is castable or consumable.

2. The method of claim 1, wherein the premanufacturing of the core (6) comprised in substep (S11) comprises the techniques of casting, injection of metals, centrifugal casting, additive manufacturing, sintering or mechanical forming.

3. The method of claim 1, wherein the premanufacturing of the core (6) comprises the technique of mechanical forming, said mechanical forming comprising the dispatch of a semi-finished preform to a line of forming presses, said preform being deformed and molded by forming presses until the geometry of the core (6) is created, and said preform being made of a metal of the core (6) with melt temperature lower than thermal deflection temperature of the molding material in solid state obtained according to step (S33).

4. The method of claim 1, wherein step (S1) comprises a substep (S12) subsequent to substep (S11), said substep (S2) comprising a machining of the core (6) coming from substep (S11), said machining consisting of lathing using manual of computer-controlled equipment removing material until the final geometry of the core (6) is obtained; and adjusting the dimensions up to the desired tolerance by grinding or polishing methods.

5. The method of claim 1, wherein:
    in sub-step (S21), the machining of the metal insert (2) is carried out by lathing and milling methods, and is performed on equipment operated manually or by numeric control;
    in substep (S22), inspecting and refining of the metal insert (2) is carried out by manual or automatic methods for checking critical assembly dimensions and subsequent polishing or grinding;
    in substep (S31) the core (6) is a metal alloy metal, the molding material comprises an injection temperature greater than the melt temperature of said metal alloy, wherein said core (6) comprises a volume Vn, and wherein after receipt of the core (6) and of the metal insert (2), the mold (7) comprises a cavity, said cavity comprising an internal volume Vp of up to one and a half times smaller than the volume Vn of the core (6);
    in substep (S33), the molding material is cooled and solidified in a wait time selected from the range between 10 and 120 seconds; and
    in substep (S36), the means that alter the structural integrity or the physical state of the core (6) are techniques selected from the group comprising heating by induction, bathing or solubilization, wherein the molding material is: a (i) polymer material of a (i-1) single polymer or of a (i-2) mixture of two polymers A and B; wherein said (i) polymer material is added to the mold (7) at temperatures between 280° C. and 420° C.; and wherein the volume ratio of polymer A relative to the polymer B in the mixture of two polymers A and B is selected from the range between 95:5 (v: v); and 20:80 (v: v).

6. The method of claim 5, wherein"
    the single polymer is selected from: polyurethane prepolymer, cellulose, fluoropolymer, interpolymer ethylene alloy elastomer, ethylene vinyl acetate, nylon, polyetherimide, polyester elastomer, polyester sulfone, polyphenylamide, polypropylene, polyvinylidene fluoride or thermosetting polyurea elastomer, acrylics, homopolymers, acetates, copolymers, acrylonitrile-butadinene-styrene, fluoropolymer thermoplastics, inomers, polyamides, polyamide-imides, polyacrylates, polyacrylates, polyacrylates, polyacrylates polycarbonates, polybutylene, terephthalates, polyether imides, sulfones polymer, thermoplastic polyimides, thermoplastic polyurethanes, polyphenylene sulfides, polyethylene, polypropylene, polysulfones, polyvinylchlorides, styrene acrylonitriles, polystyrenes, polyphenylene, mixtures of ether, styrene maleic anhydrides, polycarbonates, allyls, amines, cyanates, epoxies, phenolics, unsaturated polyesters, bismaleimides, polyurethanes, silicones, vinylesters, urethane hybrids, polyphenylsulfones, copolymers of polyphenylsulfones with polyetersulfones or polysulfones, copolymers of polyphenylsulfones with siloxanes, mixtures of polyphenylsulfones with polyphenylsulfones with polyetersulfones or polysulfones, copolymers of polyphenylsulfones with siloxanes, mixtures of polyphenylsulfones of polyphenylsulfones with copolymers of polyphenylsulfones and copolymides of polyphenylsulfones with siloxanes, mixtures of polyphenylsulfones and copolymides of polyphenylsulfones, polysiloxanes, or mixtures of polyetherimides and copolymers of poly (etherimide-siloxane);

the polymer A is selected from: polyurethane pre-polymer, cellulose, fluoropolymer, interpolymer ethylene alloy elastomer, ethylene vinyl acetate, nylon, polyetherimide, polyester elastomer, polyester sulfone, polyphenylamide, polypropylene, polyvinylidene fluoride or thermosetting polyurea elastomer, acrylics, homopolymers, acetates, copolymers, acrylonitrile-butadinene-styrene, fluoropolymer thermoplastics, inomers, polyamides, polyamide-imides, polyacrylates, polyacrylates, polyacrylates, polyacrylates polycarbonates, polybutylene, terephthalates, polyether imides, sulfones polymer, thermoplastic polyimides, thermoplastic polyurethanes, polyphenylene sulfides, polyethylene, polypropylene, polysulfones, polyvinylchlorides, styrene acrylonitriles, polystyrenes, polyphenylene, mixtures of ether, styrene maleic anhydrides, polycarbonates, allyls, amines, cyanates, epoxies, phenolics, unsaturated polyesters, bismaleimides, polyurethanes, silicones, vinylesters, urethane hybrids, polyphenylsulfones, copolymers of polyphenylsulfones with polyetersulfones or polysulfones, copolymers of polyphenylsulfones with siloxanes, mixtures of polyphenylsulfones with polyphenylsulfones with polyetersulfones or polysulfones, copolymers of polyphenylsulfones with siloxanes, mixtures of polyphenylsulfones of polyphenylsulfones with copolymers of polyphenylsulfones and copolymides of polyphenylsulfones with siloxanes, mixtures of polyphenylsulfones and copolymides of polyphenylsulfones, polysiloxanes, or mixtures of polyetherimides and copolymers of poly (etherimide-siloxane); and the polymer B is a mixture of polymer B with a structural reinforcement, said structural reinforcement being selected from: fiberglass, carbon or aramid, and said polymer B being selected from: fiberglass, carbon or aramid, and said polymer B being selected from: polyurethane pre-polymer, cellulose, fluoropolymer, interpolymer ethylene alloy elastomer, ethylene vinyl acetate, nylon, polyether imide, polyester elastomer, polyester sulfone, polyphenyl amide, polypropylene, polyvinylidene fluoride or thermosetting polyurea elastomer, acrylics, homopolymers, acetates, copolymers, acrylonitrile-butadiene-styrene, fluorine thermoplastic polymers, inomers, polyamides, polyamide-imides, polyacrylates, polybaterketones, polypharyl-sulfones, polybaterylates, polyether imides, polyether sulfones, thermoplastic polyimides, thermoplastic polyurethanes, polyphenylene sulfides, polyethylene, polypropylene, polysulfones, polyvinyl chlorides, acrylonitrile styrene, polystyrenes, polyphenylene, mixtures of ether, styrene maleic anhydrides, polycarbonates, allyls, aminolates, and unsaturated polyester, bismaleimides, polyurethanes, silicones, vinylesters, urethane hybrids, polyphenylsulfones, copolymers of polyphenylsulfones with polyetersulfones or polysulfones, copolymers of polyphenylsulfones with siloxanes, mixtures of polyphenylsulfones (polyphenylsulfones with polysiloxanes) and mixtures of polyetherimides and copolymers of poly (etherimide-siloxane), wherein in the mixture of polymer B with structural reinforcement, the volume ratio of polymer B relative to the structural reinforcement is selected from the range between 95:5 (bv) and 40:60 (bv).

7. The method of claim 1, further comprising the following steps:
   a substep (S42), subsequent to substep (S41), said substep (S42) comprising removal of impurities from the supernatant material of the core (6) in liquid state; and
   a substep (S43), subsequent to substep (S42), said substep (S43) comprising an addition of raw material in the core (6) in liquid state, said raw material selected from the group comprising bismuth-tin-cadmium (53,5Bi-26Sn-20,5Cd), bismuth-lead (56,5Bi-43,5Pb), bismuth-tin (57Bi-43Sn), tin-lead-silver (62,5Sn-36Pb-1,5Ag), tin-lead-bismuth (63Sn-34Pb-3Bi), tin-lead (61,9Sn-38,1Pb) and tin-zinc (89,1Sn-8,9Zn).

8. The method of claim 1, wherein the core (6) is a metal alloy selected from: eutectic alloys of tin and lead or tin and zinc, and the metal insert (2) is a metal selected from: aluminum, brass, titanium, inconel or steel.

\* \* \* \* \*